United States Patent

[11] 3,577,866

[72] Inventors John F. Ehrenfried
Akron;
Charles M. Gardner, Manchester, Ohio
[21] Appl. No. 865,795
[22] Filed Oct. 13, 1969
Division of Ser. No. 654,858
Aug. 20, 1967, Pat. No. 3,504,476
[45] Patented May 11, 1971
[73] Assignee The Goodyear Tire & Rubber Company
Akron, Ohio

[54] PACKAGING APPARATUS AND PACKAGE
7 Claims, 14 Drawing Figs.
[52] U.S. Cl. ..................................... 53/184,
53/210, 206/65
[51] Int. Cl. ....................................... B65b 11/40,
B65b 53/02
[50] Field of Search ........................... 206/65 (S),
45.34, 45.33; 53/210, 223, 224, 225, 226, 227,
228—234, 389, 32, 33; 53/184

[56] References Cited
UNITED STATES PATENTS
2,451,287 10/1948 Hoppe ........................... 53/210
2,860,466 11/1958 Ingram .......................... 53/223
3,466,849 9/1969 Schaefer et al. ............... 53/210

FOREIGN PATENTS
680,252 10/1952 Great Britain ................ 53/234
857,045 12/1960 Great Britain ................ 53/182

Primary Examiner—Theron E. Condon
Assistant Examiner—Neil Abrams
Attorneys—F. W. Brunner and Gordon C. Mack ABSTRACT: The material to be packaged, referred to herein as the content of a package, may be one or more boxes, or cans on a tray or trays, or a stack of magazines, etc. A series of these, all of the same size or different sizes are fed successively through the apparatus where each is individually wrapped in heat-shrinkable, heat-sealable film to form an open-ended package with the ends of the film overlapped under the package. The overlapped ends of the film are heated and sealed to one another. The entire package is then heated and the film is shrunk tight on the content, and the edges of the film which extended beyond the content are shrunk in over the ends of the content.

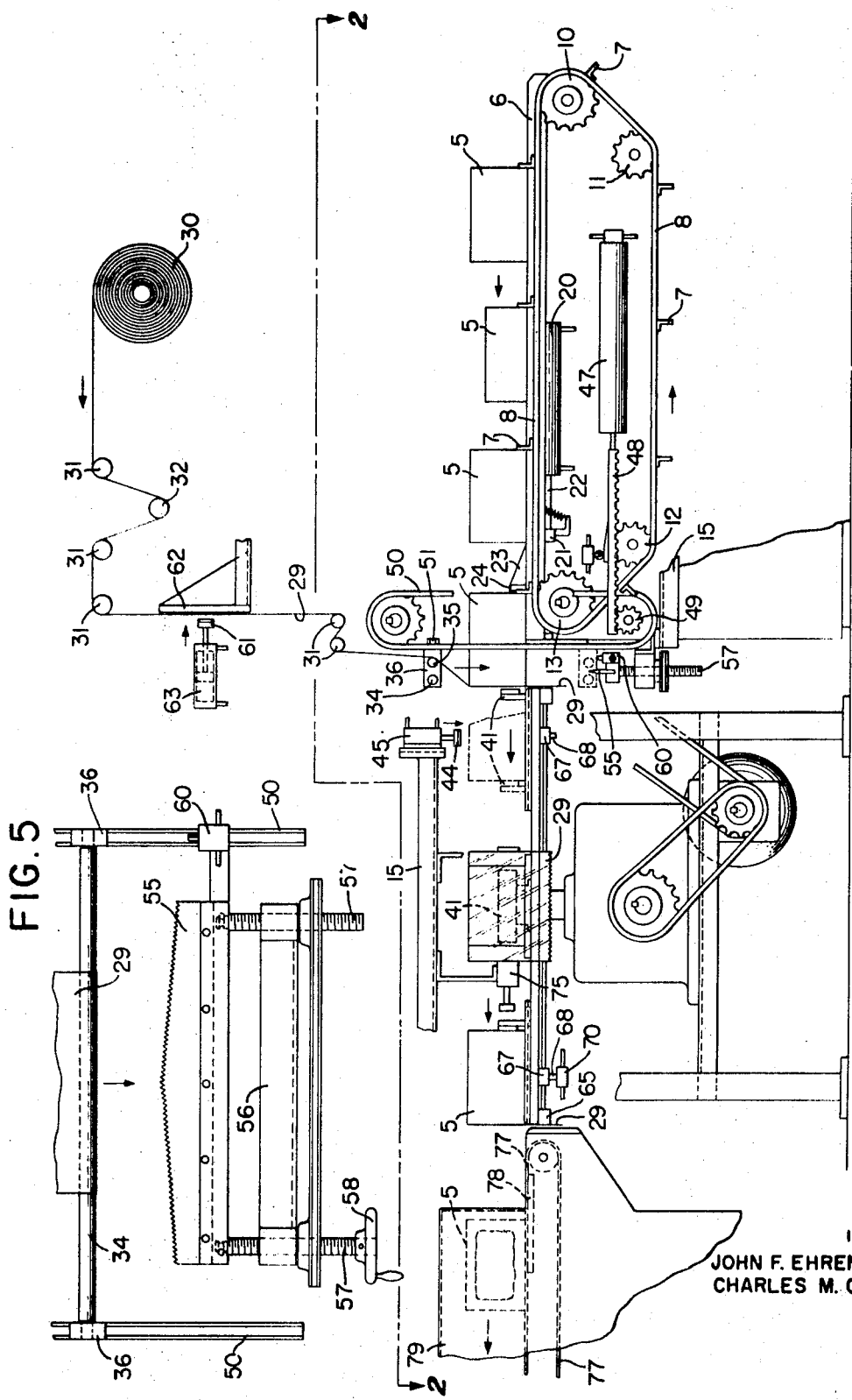

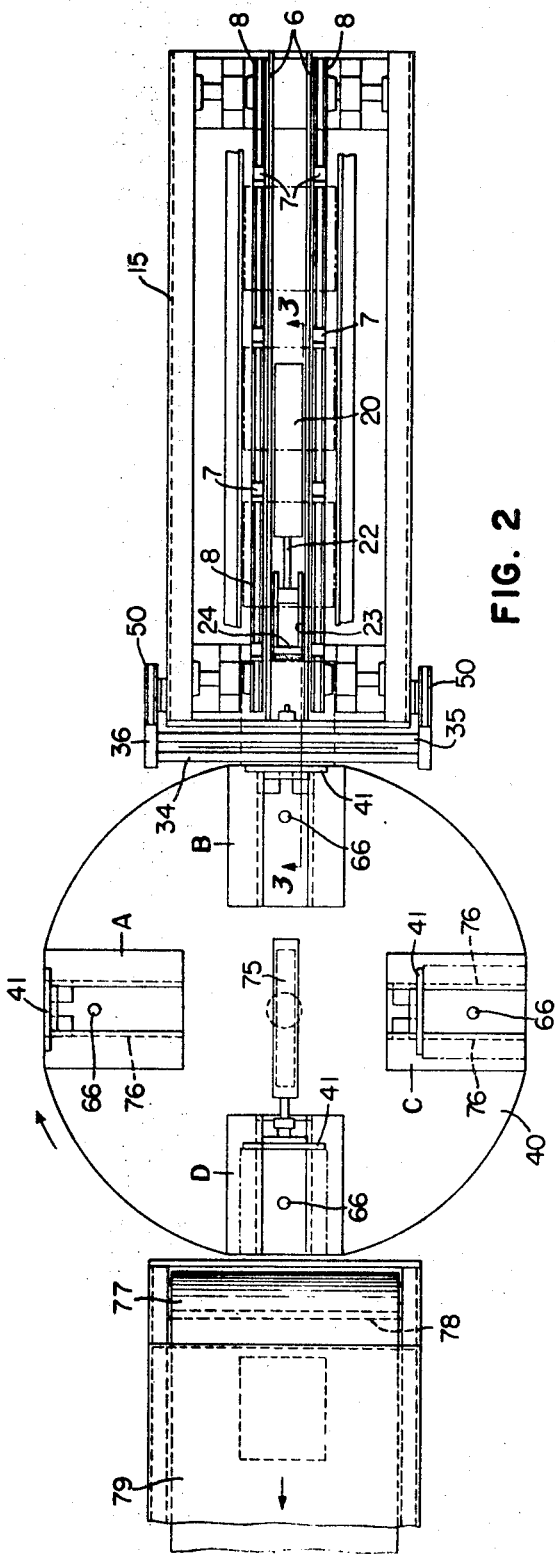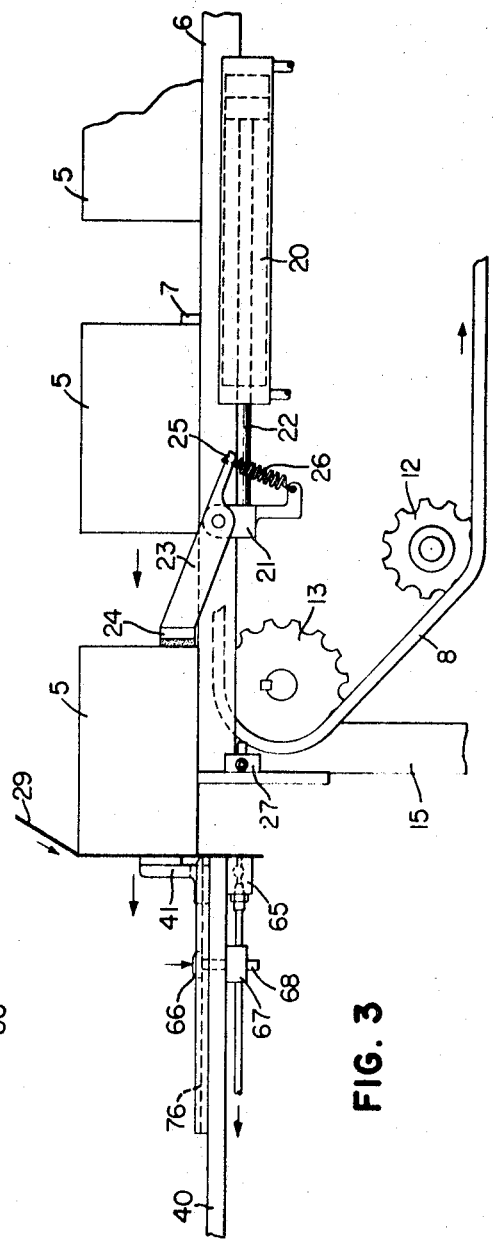

Patented May 11, 1971
3,577,866
4 Sheets-Sheet 3
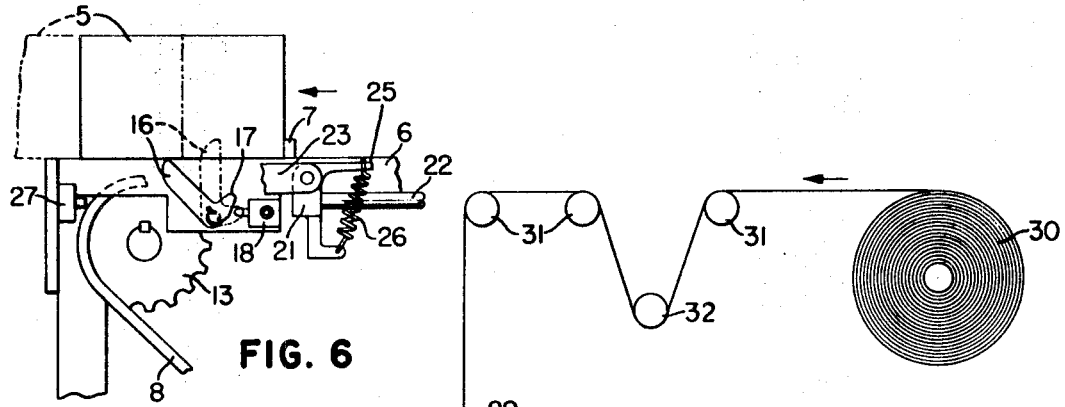
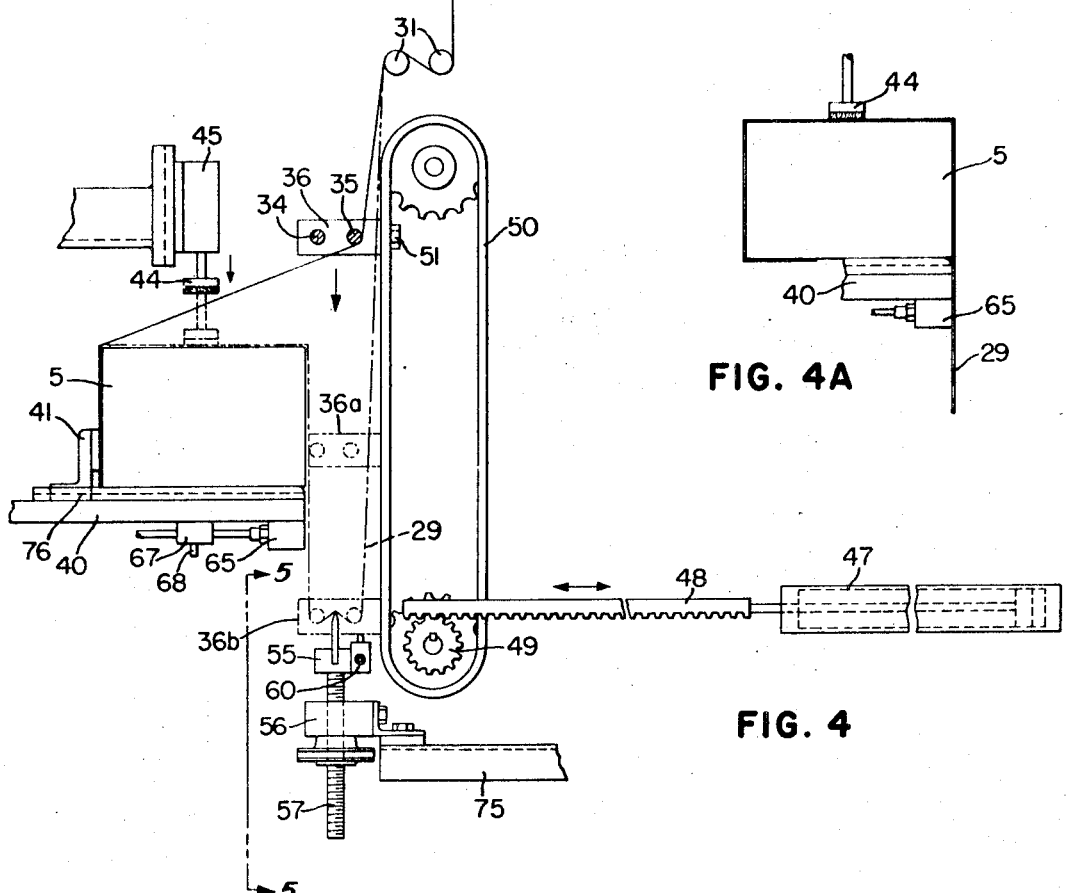
INVENTORS
JOHN F. EHRENFRIED
CHARLES M. GARDNER Patented May 11, 1971 3,577,866
4 Sheets-Sheet 4
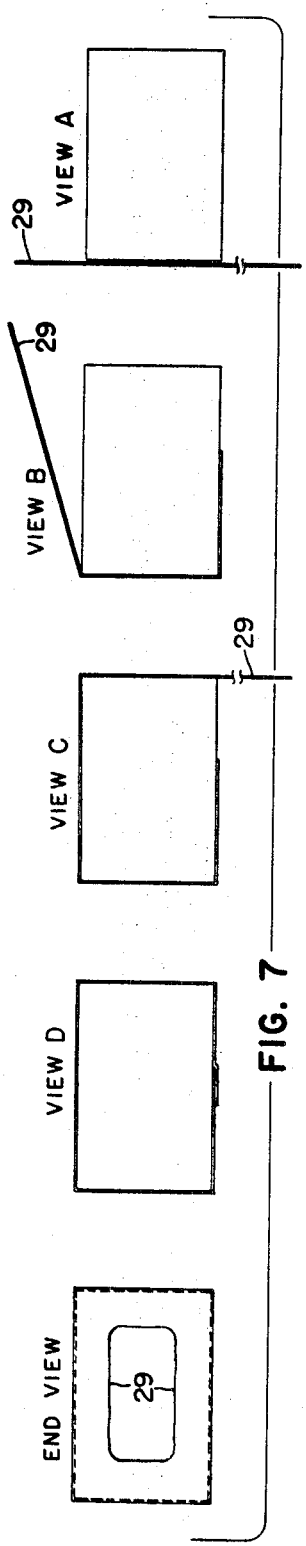
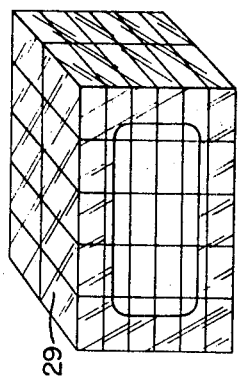
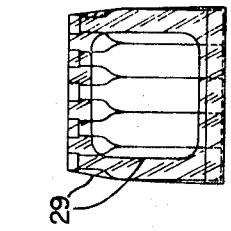
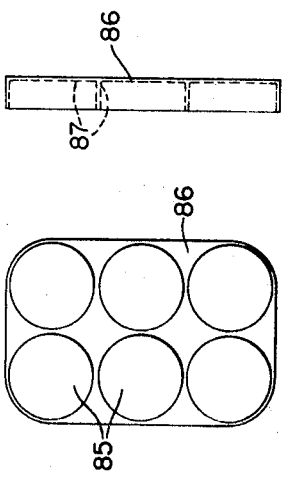
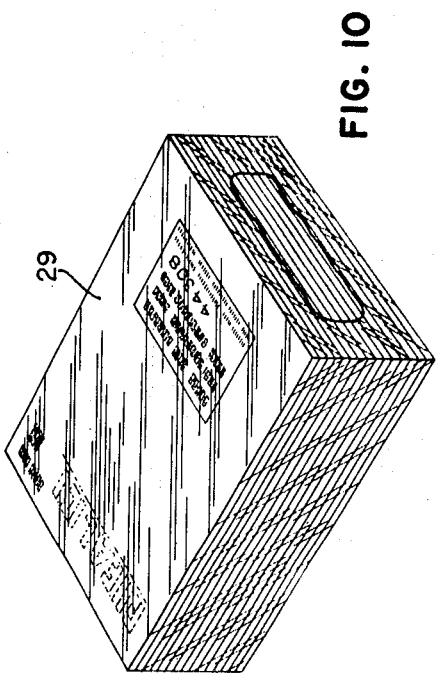
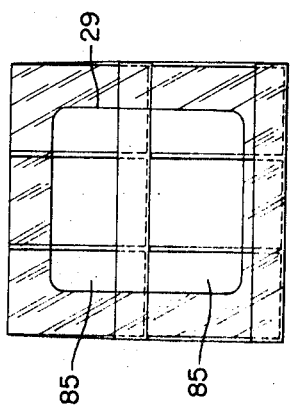
INVENTORS
JOHN F. EHRENFRIED
CHARLES M. GARDNER

PACKAGING APPARATUS AND PACKAGE

This application is a division of our application Ser. No. 654,858 filed July 20, 1967, now U.S. Pat. No. 3,504,476.

The invention relates to the packaging of materials in heat-sealable, heat-shrinkable film in successive packaging operations to form a plurality of individual packages. The invention includes packaging apparatus and the packages.

The invention is well suited for the successive packaging of a wide variety of materials referred to herein as the package contents. The contents of the successive packages may be of different sizes or the same size. The ends of the contents may be of irregular shape but the central portion is of uniform cross section, being generally circular or rectangular. The ends may be flat as in a box. The contents of each single package may be one or more boxes, a plurality of bottles, canned goods on a single tray or other support or tiered on a plurality of trays or the like, a pile of magazines, etc. For instance, a plurality of cans may be supported on a shallow tray of fibrous composition, plastic, or metal, molded to fit the bottoms of the cans so as to maintain the cans in a prearranged and level position.

The invention is adapted to the wrapping of materials at their source, as at a canning factory or printing plant; or at a distribution center, as at a wholesale grocery warehouse; or at a retail outlet, as at a supermarket; or elsewhere.

The film used is preferably the type commonly referred to as a unilaterally stretched film, although biaxially oriented film may also be used. For instance, for packaging a bundle of magazines, each measuring about 8 ½ × 11 inches and 6 inches high, a film which on heating shrinks to 40 to 50 percent of its original size has proven satisfactory. The amount of shrink in the film must be such that on heating it forms a snug fit with the content of the intended package, but without crushing or distorting it. It may be heat-shrinkable, and heat-sealable polyvinylchloride or other vinyl film, polyester film, polyethylene or polypropylene film, etc., suitably plasticized, if necessary. Although the film is generally transparent, opaque film may be used.

The machine supplies the film as required as the content for each package is presented for packaging. The content is pushed into the film to partially wrap the film around it. Then the film is cut to the desired length and the wrapping of the film around the content is completed to form an open-ended package. The ends of the film are overlapped under the content and heat-sealed and the edges of the film extend out beyond the edges of the content of the package. The package is then heated in a shrink tunnel or other suitable equipment for heating the film to shrink it tight around the package, and shrink the open-ended edges of the film against the ends of the package content.

The invention is further described in connection with the accompanying drawings in which preferred equipment for carrying out the process is illustrated. In the drawings:

FIG. 1 is a longitudinal elevation of the equipment taken inside of its supporting frame;

FIG. 2 is a plan view on line 2–2 of FIG. 1;

FIG. 3 is an enlarged elevational detail on the line 3–3 of FIG. 2, showing that portion of the equipment which pushes the package contents into the film and on to a turret;

FIG. 4 is an enlarged elevational detail of the film-handling equipment and adjacent means;

FIG. 4A is a representation similar to a detail of FIG. 4 but after the film has been cut and the freshly cut end is held against the turret by vacuum;

FIG. 5 is an enlarged cross-sectional detail of the cutoff mechanism on the line 5–5 of FIG. 4;

FIG. 6 is an enlarged cross-sectional detail of the trip which actuates the discharge mechanism shown in FIG. 3;

FIG. 7 illustrates schematically the various steps by which the film is wrapped around the package;

FIGS. 8 and 8A are a plan view of several cans seated in a molded tray ready for packaging, and an end view of the tray;

FIG. 9 is a package of two tiers of canned goods;

FIG. 10 is a package of magazines;

FIG. 11 is a package of bottles; and

FIG. 12 shows a packaged bundle of boxes.

The content 5 of each individual package is supplied on horizontal slide rails 6 by drive lugs 7 which are fastened to chains 8 carried by sprockets 10, 11, 12 and 13 suitably mounted in frame 15. These are driven by a motor controlled by a master switch (not shown) and the entire operation is started and stopped by this switch.

The materials to be packaged are placed on the slide rails and moved forward by lugs 7. It is not necessary to have a content 5 positioned for forward movement by each set of lugs. As the lugs move each content forward it depresses trip 16 (FIG. 6), and when the content has passed over the trip it returns upward (due to spring means not shown) and the tip 17 actuates air switch switch 18 which in turn actuates the kickoff air cylinder 20 (FIG. 1). This cylinder is between and beneath rails 6. It operates the kickoff unit (FIG. 3). It includes block 21 fastened to plunger 22. Arms 23 pivoted to opposite ends of the block 21 carry the kickoff cross plate 24. Their rear ends 25 are pulled down by springs 26 which tend to raise the plate 24 just above the slide rails 6 so that as the plunger 22 of the cylinder 20 is extended, the plate 24 contacts the contents in succession and pushes them forward, off of the slide rails. At the forward end of the stroke of the plunger, the block 21 actuates switch 27 and this returns the plunger to its original position within the cylinder 20. The plate 24 continues in its raised position until it is pushed down by an oncoming content 5.

The film 29 is fed from the supply roll 30 over guide rolls 31 and festoon roll 32. The film hangs down beside the wiper rolls 34 and 35 mounted on carriage 36, and down across the path of the package contents as shown in FIG. 1. As the content of each package leaves the slide rails (FIG. 1) it is pushed into the free end of the film, the free end being of such a length as to extend under the front part of the content of the package as it is pushed from the slide rails on to turret 40 which is operated continuously by the motor, etc. shown in FIG. 1, on an interrupted basis through a Furgeson (or Geneva) drive or the like, stopping four times in each complete cycle.

Referring to FIG. 7, in view A the content 5 is shown as through it is on the slide rails 6. It will be seen that the free end of the film hangs down below the bottom of the package. As the content 5 is pushed into the film (View B) and onto the turret, the film is clamped between the forward face of the content 5 and the clamp bar 41 (FIG. 3). The free end of the film slides over the top of the turret and is thus brought under the forward end of the bottom of the content 5, as shown in view B of FIG. 7.

At the forward end of the stoke of the kickoff cylinder 20 the plate 24 comes just to the edge of the turret 40 so that the back edge of the content 5 is in line with the edge of the turret, and is then in the position shown in FIG. 4.

When the plunger 22 of the kickoff cylinder reaches the forward end of its stroke and actuates the switch 27, this switch not only returns the plunger to the cylinder 20 but it also (1) causes the plunger 44 (FIG. 1) to be thrust downward from cylinder 45 to press the film against the content 5 as shown in FIG. 4 and (2) simultaneously it actuates the cylinder 47 (FIG. 4) to move the rack 48 forward and operate the gear 49 to put the chain 50 in operation. The block 36 to which the wiper rolls 34 and 35 are attached is fastened to chain 50 by means 51. Thus, as the cylinder 47 is operated the wiper rolls are lowered through the position 36a (FIG. 4) to the position 36b which presses the film against the stationary knife 55. As shown in FIG. 5, this knife is supported in the bracket 56 which is attached to the frame of the apparatus (as shown in FIG. 1) by screws 57 and it is adjusted by the handle 58 to locate the knife at the required height. As the wiper rolls press the film against the knife 55 the block 36 actuates switch 60 (FIGS. 4 and 5) so that the plunger 61 of cylinder 63 (FIG. 1) clamps the film against the support 62. Thus the film is held taut between the clamping plate 41 and this clamp 61, 62, and as the wiper rolls reach the bottom limit of their movement the film is cut from edge to edge. The wiper rolls then return to their former position and the freshly cut edge of the film hangs over the rear end of the package as shown in view C of FIG. 7. This free end is sucked against the block 65 by vacuum (FIG. 4A), the vacuum switch being actuated by the weight of the content 5 on plunger 66 (FIG. 3).

Thus the freshly cut free end of the film is held against the block 65 as the turret is rotated. The free end of the film 29 is readily seen as hanging over the rear end of the package at the middle of the turret in FIG. 1. The free end of the film is maintained against the block 65 as the turret rotates through 180° and brings the content of the package from the end of the slide rails 6 to the sealing plate and shrink tunnel.

The turret can equally well be designed to discharge the package after traveling 90° or 270°. As a matter of fact, instead of having four positions on the turret, the turret may be designed with any number of positions and may carry the package through any desired portion of the complete cycle. If the turret is designed with four package positions and carries the package through only 90°, the number of packages handled by the machine can readily be doubled by providing a second feeding and film-cutting unit on the opposite side of the turret.

The plunger 66 which actuates the vacuum valve 67 (FIG. 3) extends below the valve box and when the turret has turned through 180°, the bottom 68 of this plunger actuates the valve 70 (FIG. 1) and this activates the cylinder 75 (FIGS. 1 and 2) which is suspended from the portion 15 of the frame above the turret. The plunger of the cylinder 75 is extended and presses against the clamp bar 41 which moves the package from the turret onto a sealing belt 77.

The four stations of the turret are designated by the letters A, B, C and D in FIG. 2. As the turret rotates it stops at each of these stations. At Station A, there is no package on the turret and the clamp bar 41 is at the edge of the turret. The base of the clamp bar is dovetailed into the surface of the support on the turret, as indicated at 76 in dotted lines. As the turret is rotated to station B and stops there, the content of a package is pushed into the film and against the clamp bar 41 and pushes it radially toward the center of the turret, as shown. While the turret is rotated to station C, the freshly cut bottom end of the film is sucked by vacuum to the edge of the turret and held there to prevent it from unwrapping. When the turret is rotated to position D the bottom of plunger 68 (FIG. 1) actuates valve 70 and the plunger of cylinder 75 pushes against the clamp bar 41 and pushes the content on to belt 77, as above described. Then the turret is rotated to position A.

As the package moves on to the belt the end of the film which we have referred to as the freshly cut end of the film which has been hanging down over the edge of the turret and is held there by vacuum, is slid upward so that it is free of the vacuum opening and it is folded under the package where it overlaps the opposite end of the film, as indicated in view D of FIG. 7. The sealing plate 78 heats the belt and the overlapped ends of the film which are at the bottom of the package. Thus the film is sealed into a tube with its ends extending from the opposite edges of the package. The belt carries the package through the heating tunnel 79 where the entire film is heated and shrunken. It shrinks longitudinally into tight contact with the content of the package and the edges of the film are shrunk down over the ends of the content of the package as indicated in the end view in FIG. 7.

The entire operation is automatic and controlled by the single main switch. The different kinds of packages which are to be described go through the same series of packaging steps.

The equipment lends itself readily to the packaging of canned goods either for display as a completed package on the shelf of a supermarket, or for delivery of the canned goods to the shelf where they are transferred from the package to the shelf by an attendant and eventually removed individually by the shopper. In the package illustrated in FIGS. 8 and 8A any convenient number of cans 85 are located in a molded plastic tray 86 with depressions 87 equal to the number of cans. If there are chimes on the cans, these depressions need be only slightly deeper than the depth of the chimes, the chimes of the separate cans being thus separately engaged in the tray. Such a tray may be formed from plastic by molding depressions, such as shown, into it, or it may be fabricated from a thin sheet of metal, for instance, which is of substantially uniform thickness after shaping. The tray may, for example, hold four cans for convenient handling by the shopper, or as many as six or nine or more. As a matter of fact, two or more of these loaded trays may be stacked one on top of another, and wrapped together, forming an individual package. The housewife or other person can easily lift such a package by inserting several fingers under the inturned shrunken edge of the film at the end of the package. After release, the film will usually retract to its original position adjacent the end of the content of the package. A tear tape for opening the package can readily be provided by equipment which operates on the content of the package either before the film is applied or thereafter.

FIG. 9 illustrates a different type of packaged cans. The drawing shows two tiers of cans in a single package, but it is to be understood that the package may contain a single tier or more than two tiers of cans. In the packaging operation, successive packages may contain a different number of tiers. Each tier of cans is supported on a separate support which may be a tray or a perfectly flat plate of cardboard or the like. These supports are all of the same area and may be just the area of the assembled cans, although they need not be quite as large as the area covered by the cans. In forming such a package the several tiers of cans may be delivered automatically to the slide rails, or each of the separate supports carrying its own cans may be separately delivered, and the different tiers will then be stacked on one another while resting on the slide rails. Cans packaged in this manner need not be placed in cartons but may be delivered directly to the supermarket and the attendant there may take the package to the shelf where the cans are to be displayed before opening the package. Alternatively, small packages of this type may be placed on the shelf to be purchased by a customer.

Boxes may be similarly bundled with or without a support. They may be stacked vertically or horizontally or both. For instance, many small packages of pharmaceuticals may be bundled into a larger package enclosed by film as herein described, and such film-covered packages may then be placed in a master shipping carton. This saves the expense of small cartons.

FIG. 10 shows a package of magazines. The magazines are all of one issue and therefore of one shape. They are stacked one above another. Successive packages may contain a different number of magazines so that packages can be shipped and delivered without repackaging, the number of magazines in each package being that required by the respective customers. Thus, there may be four magazines in one package and six magazines in the next package, or perhaps many more. The number of magazines per package may be determined by the number of magazines to be mailed to the different zip code numbers of the subscribers. The number of magazines shipped to each zip code number will be stacked in individual piles on the slide rails and move successively to the packaging equipment. On each stack there may be placed a card or the like giving the zip code number and whatever additional information will be useful. Thus in the finished package this card will be visible through the film on the opposite side of the package from that at which the ends of the film are heat-sealed together. Thus the packages may be readily shipped directly from the end of the packaging machine to the post office. The individual magazines may be addressed to individual subscribers, but where the magazines are sent to dealers, such individual addressing is not required. Thus, successive stacks of magazines will move along the slide rails, often with different numbers of magazines in adjacent stacks and all will be packaged, in turn, in the manner described. The bound edge of the bottom of each stack will be faced forward so that the stack can be transferred from the slide rails to the turret without scuffing up the bottom sheets of the bottom magazine which would become scuffed if the bound edge were not forward. All of the magazines may be faced in this manner, although it may be desirable to turn some of the upper magazines in each stack so that the bound edge is to the rear.

Books can be packaged similarly, and where they are packaged for distribution, different numbers of books may be put in successive packages. Also, if a book is published in several volumes, all volumes may be bound together. If the books are paper covered the binding of the bottom book will advantageously be faced toward the front of the package. (In the claims, magazines are included in the expression "soft-covered books.") If the book is hard-covered, this is not necessary. Although generally the bound edge of a magazine or paperback will be made the leading edge, it is not impossible that some other edge such as the top or bottom of the book, or even the edge opposite the bound edge may be placed forward.

Bottles may be packaged on a tray or other support in a manner similar to that discussed in the packaging of canned goods. One or more tiers of bottles may be packaged in this way. If the bottles are glass bottles, the film when shrunken tight around the bottles prevents the bottles from moving and hitting against one another, and thus reduces or eliminates breakage of the bottles, whether empty or filled. It is conceivable that the transfer of a plurality of upright bottles before being wrapped can be transferred from the slide rails to the turret over a removable bridge or the like so that the support can be eliminated. The idea of shrinking a wrapper around bottles to hold them tight against one another to prevent them from breaking is novel and one of the patentable features of the invention.

FIG. 12 illustrates a bundle of boxes. If the boxes are relatively flat they may be stacked one on top of another much as magazines may be stacked, and then there is no difficulty in wrapping them into a single package by the method here described. Boxes of square cross section may be similarly packaged. The boxes may contain foodstuffs, pharmaceuticals, hardware, etc. If the boxes are to be delivered to subscribers of gifts of various types to be delivered monthly or at other regular intervals, different numbers of boxes to be delivered to the areas covered by different zip codes of the postal system will be packaged in successive bundles.

The invention is useful in a wide variety of different packaging operations only a few of which are described and shown, as illustrative.

We claim:

1. Packaging apparatus which comprises means for supporting an expanse of film from above with means for clamping the film in position above the bottom end thereof, means for moving the content of a package against the film on to a support whereby the film covers the forward end of the bottom of the content and extends upwardly back over the top of the package, a pair of wiper rollers arranged laterally side by side above the upwardly extending expanse of the film, means for lowering these rollers and thereby covering the rear of the content with the film, a stationary knife parallel to the wiper rollers with means for lowering the rollers into position on opposite sides of the knife while said clamp holds the film and thereby cutting the film between the rollers, means for sliding the content off of the support with its rear end forward and thereby moving the freshly cut end of the film into overlapping relation with the end of the film which covers the forward end of the bottom of the content.

2. The apparatus of claim 1 which comprises a sealing bar with means for heating the same, and means for pushing the content of the package over this sealing bar to wipe the freshly cut end of the film against the bottom of the package.

3. The apparatus of claim 2 which comprises a shrink tunnel with means for moving the package from contact with the sealing bar into the shrink tunnel.

4. Apparatus for wrapping the intended content of a package in film with means for moving the content of the package against film supported in film-supporting means onto a rotatable support and thereby wrapping the film around the forward end of the content with one end of the film under the content, means for rotating the support about a vertical axis and means for moving the content so wrapped radially in the reverse direction off the support onto a second support to overlap the ends of the film, with a heat-sealing plate in the surface of the support for sealing the overlapped ends of the film, and means for heating the package after it has passed over the heat-sealing plate all of said means being in one plane.

5. Packaging equipment which comprises first, second and third supports, the second support being rotatable with respect to the other two, a support for a supply of film and means for draping a loop of the film between the first and second supports, means for cutting the film into first and second portions near the bottom of the loop, means for sliding the contents of packages successively from the first support against the first portion of the film loop and then on to the second support, and means for rotating the second support and for pushing the contents successively back off the second support onto the third support, means for temporarily holding the first portion of the loop of the film against a package content after the content is moved against it, means for removing the second portion of the film from between the first and second supports, means for heating the area of the third support contacted by the bottom of a content slid onto it, and a shrink tunnel on the third support.

6. The equipment of claim 5 in which the means for pushing a content back off of the second support is a clamp bar and there is means for moving the clamp bar to push the content.

7. The apparatus of claim 5 which comprises an opening in the second support just below the area of the surface on to which a content is to be slid, and vacuum means is provided at the opening to suck film to the support.

PO-1050
(5/69)

UNITED STATES PATENT OFFICE
CERTIFICATE OF CORRECTION

Patent No. 3,577,866          Dated May 11, 1971

Inventor(s) John F. Ehrenfried and Charles M. Gardner

It is certified that error appears in the above-identified patent and that said Letters Patent are hereby corrected as shown below:

Column 5, line 53, change "package" to -- content --

Signed and sealed this 28th day of December 1971.

(SEAL)
Attest:

EDWARD M.FLETCHER,JR.          ROBERT GOTTSCHALK
Attesting Officer          Acting Commissioner of Patents